United States Patent [19]

Oosterwijk

[11] 4,124,752

[45] Nov. 7, 1978

[54] PROCESS FOR THE PREPARATION OF SBR-RUBBERS EMPLOYING BIS(1-HYDROPEROXY CYCLOHEXYL)PEROXIDE

[75] Inventor: Hendrik H. J. Oosterwijk, Schalkhaar, Netherlands

[73] Assignee: Akzona Incorporated, Asheville, N.C.

[21] Appl. No.: 823,762

[22] Filed: Aug. 11, 1977

[30] Foreign Application Priority Data

Aug. 16, 1976 [NL] Netherlands ......................... 7609074

[51] Int. Cl.² ............................ C08F 4/36; C08F 4/42; C08F 236/00
[52] U.S. Cl. ........................................ 526/94; 526/93; 526/212; 526/230; 526/340
[58] Field of Search .................. 526/93, 210, 212, 94, 526/230, 208, 232.3, 232.5, 228

[56] References Cited

U.S. PATENT DOCUMENTS

| | | | |
|---|---|---|---|
| 2,670,384 | 2/1954 | Milas | 526/230 |
| 2,694,092 | 11/1954 | Milas | 526/230 |
| 2,775,578 | 12/1956 | Fisher et al. | 526/230 |
| 2,776,953 | 1/1957 | Taues | 526/94 |
| 2,776,954 | 1/1957 | Taues | 526/94 |
| 2,908,665 | 10/1959 | Reynolds et al. | 526/230 |
| 2,908,668 | 10/1959 | Reynolds et al. | 526/93 |
| 3,049,519 | 8/1962 | Reynolds | 526/94 |
| 3,404,111 | 10/1968 | McNay | 260/27 R |
| 3,431,247 | 3/1969 | Gulpen et al. | 526/232.3 |
| 3,635,936 | 1/1972 | Gropper et al. | 526/228 |

FOREIGN PATENT DOCUMENTS 4,318,549  8/1943  Japan ......................... 526/212

*Primary Examiner*—Herbert J. Lilling
*Attorney, Agent, or Firm*—Francis W. Young; Robert F. Green

[57] ABSTRACT

An improved process for the preparation of SBR rubber is disclosed wherein the emulsion polymerization of styrene and butadiene is conducted in the presence of a redox system comprising a standard activator system and bis(1-hydroperoxy cyclohexyl) peroxide as the initiator.

4 Claims, No Drawings

PROCESS FOR THE PREPARATION OF SBR-RUBBERS EMPLOYING BIS(1-HYDROPEROXY CYCLOHEXYL)PEROXIDE

BACKGROUND OF THE INVENTION

This invention relates to an improved process for the preparation of SBR-rubbers by the emulsion copolymerization of a mixture of styrene and butadiene.

According to U.S. Pat. No. 3,404,111 SBR-rubbers may be obtained by the emulsion copolymerization, at a temperature of about 5° C., of a mixture of styrene and butadiene, in the presence of a redox system containing p-methane hydroperoxide as the initiator and an activator system comprising ferrous sulphate.7 $H_2O$, sodium formaldehyde sulphoxylate, and the sodium salt of ethylene diamine tetra acetic acid.

French Pat. No. 1,430,710 also mentions the use of para-menthane hydroperoxide for low-temperature emulsion copolymerization of a mixture of butadiene and styrene.

British Pat. No. 727,637 describes the emulsion copolymerization, at a temperature between 50° and 90° C., of a styrene/acrylonitrile mixture and of acrylonitrile, butadiene, styrene mixtures, using 1-hydroxy-1'-hydroperoxy-dicyclohexyl-peroxide as the initiator.

SUMMARY OF THE INVENTION

An improved process for the preparation of SBR-Rubbers has now been discovered. In particular, it has now been discovered that the emulsion copolymerization of a mixture of styrene and butadiene may be conducted in the presence of a redox system comprising an organic hydroperoxide initiator and an activator system comprising a metal salt, a reducing compound, and a complexing agent for the metal salt wherein the organic hydroperoxide initiator is bis(1-hydroperoxy cyclohexyl)peroxide, which is a well-known compound and may be readily prepared by utilizing standard preparation procedures.

BACKGROUND OF THE INVENTION

Styrene-butadiene copolymers, which are also referred to as SBR-rubbers, are obtained by copolymerization of a mixture of styrene and butadiene. In such a mixture, the amount of styrene is usually 15–35% by weight, calculated on the total amount of styrene and butadiene.

Typically, the copolymerization is carried out at low temperature, usually not exceeding 15° C. The peroxide according to the invention is used in the presence of an activator system comprising a metal salt, preferably ferrous sulphate.7 $H_2O$, a reducing compound, preferably sodium formaldehyde sulphoxylate.2 $H_2O$, and a complexing agent, preferably the sodium salt of ethylene diamine tetra acetic acid. As emulsifiers, there may be used, for example, alkali salts of resin acids, aliphatic carboxylic acids, alkyl sulphonic acids, and aryl sulphonic acids.

The peroxide to be used according to the invention may be incorporated into the emulsion in a wide range of amounts. Typically, by weight, about 0.01% to about 1.0%, and preferably about 0.05% to about 0.3%, calculated on the total amount of monomers, is utilized. The peroxide may be used as such or in phlegmatized form, for instance, as a mixture of peroxide, ester and water, or peroxide, hydrocarbon and water.

The invention will be further described in the following nonlimiting example.

EXAMPLE

In a 1 liter-autoclave, at a temperature of about 5° C., and at a stirrer speed of about 400 r.p.m., the following aqueous emulsion was copolymerized over a period of 8 hours.

| | | |
|---|---|---|
| water (oxygen-free) | | 400 parts by weight |
| butadiene (inhibitor-free) | | 142 parts by weight |
| styrene (inhibitor-free) | | 58 parts by weight |
| K-soap of resin acid | | 9 parts by weight |
| $Na_3PO_4 \cdot 12H_2O$ | emulsifier system | 1 part by weight |
| Na formaldehyde naphthalene sulphonate | | 0.3 parts by weight |
| $FeSO_4 \cdot 7 H_2O$ | activator system | 0.08 parts by weight |
| Na-formaldehyde sulphoxylate | | 0.2 parts by weight |
| Na-salt of ethylene diamine tetra acetic acid | | 0.12 parts by weight |
| tertiary dodecyl mercaptane modifier | | 0.36 parts by weight |
| bis(1-hydroperoxycyclohexyl) peroxide | | 0.131 parts by weight |

The aqueous emulsion was so prepared that to a solution of the emulsifiers and stabilizers in oxygen-free water there were successively added the activator system, dilute sulphuric acid in an amount sufficiently large to obtain a pH value of about 10.0, the modifier dissolved in styrene, and the initiator, also dissolved in styrene.

Of the latex, the conversion was determined after 2, 4, 6, and 8 hours' polymerization. Comparative experiments were carried out using 1-hydroxy-1'-hydroperoxy dicyclohexyl peroxide and para-menthane hydroperoxide as initiators in amounts of 0.123 and 0.085 parts by weight, respectively.

The resulting conversions are listed in the following table:

TABLE

| Peroxide | Conversion After | | | |
|---|---|---|---|---|
| | 2h | 4h | 6h | 8h |
| bis(1-hydroperoxycyclohexyl) peroxide | 13.8 | 55.0 | 89.4 | 95.9 |
| 1-hydroxy-1'-hydroperoxy-dicyclohexyl peroxide | 1.0 | 2.3 | 1.2 | 2.2 |
| para-menthane hydroperoxide | 20.0 | 59.1 | 86.8 | 90.2 |

From the foregoing table is is apparent that, for the emulsion polymerization of styrene and butadiene, bis(1-hydroperoxycyclohexyl)peroxide is far superior to 1-hydroxy-1'-hydroperoxy-dicyclohexyl peroxide as an initiator or even superior to para-menthane hydroperoxide.

What is claimed is:

1. An improved process for the preparation of SBR-rubber by emulsion copolymerization of a mixture of styrene and butadiene in the presence of a redox system comprising an organic hydroperoxide initiator and an activator system comprising a metal salt, a reducing compound, and a complexing agent for the metal salt, wherein the improvement comprises using bis (1-hydroperoxy cyclohexyl)peroxide as the initiator.

2. The improved process of claim 1 further characterized in that the bis(1-hydroperoxy cyclohexyl)peroxide is utilized in an amount from about 0.01 to about 1.0%, by weight, based on the total weight of styrene and butadiene.

3. The improved process of claim 1, further characterized in that the bis(1-hydroperoxy cyclohexyl)peroxide is utilized in an amount from about 0.05 to about 0.3% by weight, based on the total weight of styrene and butadiene.

4. The process of claim 1 wherein the metal salt is ferrous sulphate.2 $H_2O$, and the complexing agent is a sodium salt of ethylene diamine tetra acetic acid.

* * * * *